United States Patent [15] 3,650,123
Sheppard, Jr. [45] Mar. 21, 1972

[54] UNIVERSAL JOINT CONSTRUCTION

[72] Inventor: Cecil James Sheppard, Jr., Gobles, Mich.

[73] Assignee: Compact Tractor Industries, Inc., Allegan, Mich.

[22] Filed: Apr. 1, 1970

[21] Appl. No.: 24,704

[52] U.S. Cl. .............................................. 64/17 SP, 277/212
[51] Int. Cl. ............................................................. F16d 3/26
[58] Field of Search ........................................ 64/17; 277/212

[56] References Cited

UNITED STATES PATENTS 3,457,732   7/1969   Decouzon .................................. 64/17
3,087,314   4/1963   Jarvis et al. ............................... 64/17
3,481,159   12/1969  Kayser ..................................... 64/17 A Primary Examiner—Edward G. Favors
Attorney—Price, Heneveld, Huizenga & Cooper

[57] ABSTRACT

A permanently lubricated and sealed universal joint utilizing an annular element constituting both a thrust washer and a seal for retaining grease, the element having a flexible sealing flange around its outside diameter, a rigid centering flange depending from the internal diameter, and thrust bearing surfaces, one of which has equally angularly spaced grease-retaining pockets.

10 Claims, 5 Drawing Figures

INVENTOR.
CECIL J. SHEPPARD JR.
BY Price, Heneveld
Huizenga & Cooper
ATTORNEYS

INVENTOR.
CECIL J. SHEPPARD JR.

ATTORNEYS

UNIVERSAL JOINT CONSTRUCTION

BACKGROUND OF THE INVENTION

Many conventional universal joints utilize yokes and center-blocks, the yokes and center-block being jointed together by a pin or bearing so that the yokes are in contact with the center-block or pin, requiring grease to be interposed between such members. The difficulty with such an arrangement is that the grease is free to eventually work its way out from between the contacting surfaces, resulting in a gradual increase in friction and attendant wear between the two contacting surfaces. This necessitates periodic regreasing of the joint, and, of course, is the primary reason for early failure and malfunction. To allow such joints to be repaired, devices such as clip retainers must be utilized. Such devices inevitably result in an increase in swing diameter, a very undesirable characteristic in compact power trains or steering linkages.

SUMMARY OF THE INVENTION

This invention relates to a new form of universal joint construction, and to a novel thrust washer seal utilized in combination with a universal joint and/or a bearing, which combination avoids the aforesaid disadvantages of conventional joints by providing a permanently greased joint. Briefly stated, the invention provides a thrust washer seal comprising a flexible annulus, the annulus having two thrust bearing surfaces and means for sealing grease to prevent leakage away from at least one of such surfaces. The thrust washer can be utilized in combination with a bearing forcibly engaged within the annulus and with a center-block and yoke which comprise a universal joint.

Accordingly, it is a major object of the invention to provide a compact universal joint having a minimum swing diameter.

It is a related object of the invention to provide a joint of the above character which is permanently greased and sealed so as not to require fittings or disassembly for regreasing.

It is another object of the invention to provide a joint of the above character having a novel combined thrust washer and grease seal which permanently maintains grease within the bearing so as to prevent breakdown.

It is still another object of the invention to provide a joint of the above character wherein the thrust washer seal is permanently positioned between the metal parts, so as to absorb thrust generated by those parts.

The foregoing objects and advantages of the invention, as well as others equally a part thereof, will become apparent upon reference to the attached drawings and the following more detailed discussion.

DESCRIPTION OF THE PREFERRED EMBODIMENTS

Figure 1:
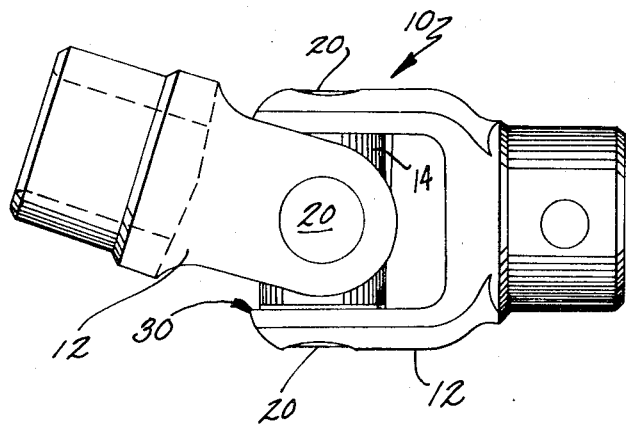
FIG. 1 is a side elevational view of a universal joint constructed in accordance with the invention.
Figure 4:
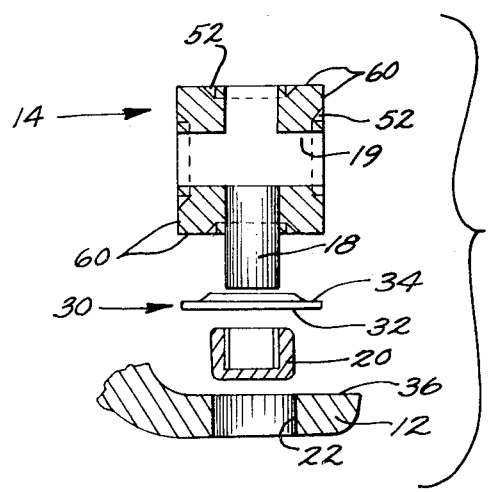
FIG. 4 is a fragmentary, exploded, partially sectioned view illustrating the assembly of the parts comprising the joint shown in FIG. 1.

The invention relates to a permanently greased, sealed joint which can be utilized in a universal joint construction such as that illustrated at 10 in FIG. 1. Such a joint is basically of the block and pin type, which is greased only initially. More particularly, the joint utilizes a pair of yokes 12 having flat parallel internal sides, which are pinned to a cubical center-block 14 (FIGS. 1 and 4) by trunnion pins 18 which are press-fitted into holes 19 in the block. The universal joint so illustrated also uses a needle-bearing assembly 20 rotatably accommodating one end of each trunnion pin 18 (FIG. 4). Basically, these bearing assemblies comprise a thin-walled cuplike shell whose cylindrical wall is lined with a series of needle-bearing elements, and such an assembly is now widely available commercially.

In accordance with the invention, the entire joint is permanently greased and permanently assembled, thereby providing for greatly improved performance, as well as significantly reducing the allowable size of the joint and its swing radius. That is, the trunnion pins 18 are press-fitted into the center-block 14, and the outer shell of the needle bearing assemblies 20 is press-fitted into each of the different openings 22 in the yokes 12.

As important part of the invention is a thrust washer seal 30, which is positioned between the center-block 14 and the adjacent arm of the yoke 12 to absorb the thrust developed between the two metal parts. This seal is also press-fitted over the outer shell of the bearing 20, to complete the permanently assembled, sealed configuration of the joint. The press fit of the seal 30 over the bearing 20 is readily accomplished, due to the outer diameter of the bearing shell being only slightly larger than the inner diameter of the seal.

Figure 2:
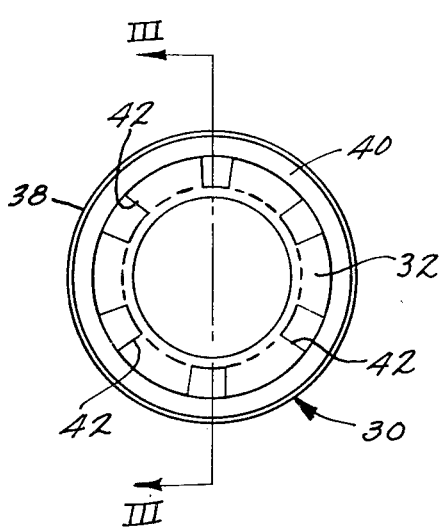
FIG. 2 is a plan view of the thrust washer seal utilized in the invention.
Figure 3:
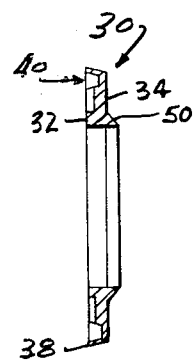
FIG. 3 is a sectional view taken through the plane III—III of FIG. 2.

Referring now to FIGS. 2 and 3, the thrust washer seal 30 basically comprises an annulus having thrust-bearing surfaces 32 and 34 on opposite sides thereof. To seal grease on the side having the bearing surface 32 against the adjacent inner thrust surface or face 36 of the yoke 12, the annulus has a circumferential flange 38 around its outermost edge which extends outwardly away from the surface 34. Flange 38 extends outwardly from surface 34 a distance which is greater than the width of the annulus between the opposite bearing surfaces 32 and 34, i.e., beyond surface 32, preferably by an actual amount which is on the order of about one one-hundredth of an inch. This greater extension of the flange insures contact between it and the yoke face 36, such that when the seal is clamped between the center-block 14 and the yoke 12, the circumferential skirt-like edge 38 of the annulus is forced against the yoke surface 36, thereby flaring the skirt slightly and preventing leakage of grease past the skirt. The flange 38 of the annulus forms a circumferential groove 40 concentric with and inwardly adjacent the flange, and the thrust surface 32 defines circumferentially spaced and recessed pockets 42 opening out into the groove 40. The groove 40 and the pockets 42 thus define a walled area which encloses and retains grease, which is in continuous contact with the inner yoke surface 36.

The entire thrust washer seal 30 may be integrally molded of a plastic material, which process readily lends itself to the manufacture of such an article, particularly when the pockets 42 are spaced so that they are equally angularly positioned around the annulus. The preferred plastic is that which is sold commercially under the trademark "Nylatron GS," which comprises nylon with a molydisulfide impregnated therein. In this form, the thrust washer has inherent lubricous surface characteristics, which are definitely advantageous, as well as desired strength and thermal expansion characteristics.

To center and to seat the annulus 30 with respect to the center-block 14, a relatively rigid annular flange 50 (FIG. 3) extends laterally from the surface 34 in a direction opposite to that of the aforementioned skirt or flange 38, flange 50 being located at the innermost diameter of the annulus and extending outwardly coaxially thereof. The flange 50 is of triangular cross section, and seats within an annular groove 52 (FIG. 4) of complementary cross section formed around each of the trunnion pin openings 19 in the center-block 14. As illustrated, the inner diameter of the annulus 30, and of its positioning flange 50, is larger than the diameter of the trunnion pins 18; consequently, the trunnion pins are at all times spaced from the thrust washer seal, since the groove 52 holds the latter in spaced coaxial relation by engaging the flange 50. Because the illustrated joint quite evidently requires four trunnion pins 18 to pin the center-block 14 to the yokes 12, the center-block is formed with the holes 54 and the annular grooves 52 on all of the four faces involved.

The basic structural parts of the joint can be formed from materials conventionally used in joints of this general type; for example, the yoke may be a steel forging and the center-block formed from cold-rolled steel, with the trunnion pins being roller bearing steel.

OPERATION

It should now be apparent that by means of the thrust washer seal 30, thrust developed between the thrust surfaces 60 of center-block 14 and the mating surfaces 36 of the yokes 12 is absorbed on the two bearing surfaces 32 and 34 of the seal, rather than being applied directly to these metal parts themselves. Furthermore, the flanges of the seal serve to keep grease in contact with the inner surfaces 36 of the yokes and with the trunnion pins 18, since flange 38 prevents loss of grease outwardly along the yoke surfaces and flange 50, in addition to positioning the seal, also prevents loss of grease outwardly along the block surfaces, thus retaining a tubular layer or coating of grease around the trunnion pins in the space between the latter and the inside diameter of the seal. This retention of the grease insures that the grease initially placed in the needle bearings 20 and on the trunnion pins will be retained, so as to prevent such bearings from breaking down. Thus, it is not necessary to regrease the joint or bearing at any time, thereby eliminating the need for structure which would otherwise make the joint bulky and require a greater swing radius.

MODIFICATIONS

Figure 5:
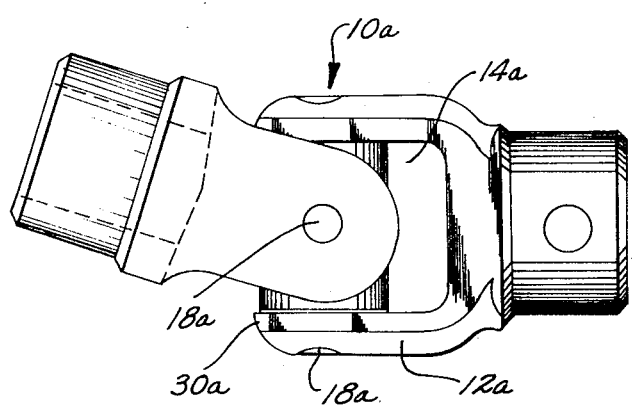
FIG. 5 is an elevational view similar to FIG. 1 but illustrating an alternate embodiment of the invention.

FIG. 5 illustrates an alternate embodiment of the invention, wherein the bearing assembly 20 has been omitted, as is permissible where a considerably reduced load is carried by the joint. In this embodiment, parts which are similar to those illustrated in the previous embodiment are labeled by the same numeral, with a distinguishing suffix "a " added thereto. Thus, joint 10a utilizes yokes 12a pinned to a center-block 14a, but instead of fitting into a bearing, the trunnion pin 18a is journaled directly in the yoke 12. Accordingly, the diameter of the hole drilled in the yoke 12a is reduced because of the narrower diameter of the trunnion pin. As in the previous embodiment, a thrust washer seal 30a is utilized between the center-block and the yoke, and such element is constructed exactly as in the case of the previous embodiment. Of course, since there is no bearing utilized in this embodiment, the annulus comprising the seal is held in place only by the grooves in the center-block and by the closely adjacent surfaces of the yoke and center-block. The sealing action of this embodiment is in general the same as in the previous embodiment, however, and the advantages of this feature in the present embodiment are quite significant, since not only is compactness a characteristic quality of the joint, but also the joint is sealed and permanently lubricated.

Although the invention has been disclosed in connection with a universal joint, it will be apparent that it can be applied to any joint utilizing metal or like parts which are greased to reduce frictional engagement and which joint is desired to be permanently lubricated so that it never has to be disassembled during the life of the parts so joined. A steering linkage is another example of a joint which could utilize the invention.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. In a universal joint, the combination of a center-block, a yoke, pin means connecting said yoke to said block, and a thrust seal positioned between a bearing surface of said block and said yoke, said seal including at least one compression-bearing wall section of predetermined thickness between said block and said yoke, said wall section defining a thrust-bearing surface and also defining pocketlike recess means for sealing grease to prevent leakage thereof away from said surface.

2. The combination as defined in claim 1, wherein said seal is an annulus having at least portions which are flexible.

3. The combination as defined in claim 1, wherein said sealing means includes a flange extending outwardly of said thrust surface at least a slight distance.

4. The combination as defined in claim 3, wherein said thrust seal is an annulus and said flange comprises an annular ridgelike formation.

5. The combination as defined in claim 4, wherein said flange is at least slightly flexible.

6. The combination as defined in claim 1, wherein said thrust seal is an annulus, and further including a bearing means having an outer diameter slightly larger than the inner diameter of said annulus, said bearing being forcibly fitted within said annulus, and said bearing being of an internal size such as to rotatably accommodate one end of said pin.

7. The combination as defined in claim 1, further including a generally cylindrical bearing means and an opening formed in said yoke for receiving such bearing means, said bearing means having an outer diameter of such size with respect to said opening as to be press-fitted therein.

8. The combination as defined in claim 1, wherein said thrust seal has at least one ridge means on the side thereof facing said bearing surface, and wherein such surface of said block defines a recess for receiving said ridge means therein to seat the thrust seal with respect to the block.

9. The combination as defined in claim 8, wherein said thrust seal is an annulus and is telescoped over said pin means, and wherein said ridge means includes portions which are generally oppositely disposed on said annulus, such that the ridge means centers the annulus about said pin means.

10. The combination as defined in claim 9, wherein said pin means has an outer diameter which is larger than the inside diameter of said annulus, to define a space therebetween.

* * * * *